United States Patent Office 3,763,068
Patented Oct. 2, 1973

3,763,068
RUBBERIZED COAL-TAR COMPOSITIONS
Paul W. Schuler, Jr., 1100 Mansion Ave.,
Collingswood, N.J. 08108
No Drawing. Continuation-in-part of abandoned application Ser. No. 858,099, Sept. 15, 1969. This application Mar. 6, 1972, Ser. No. 232,265
Int. Cl. C08f 45/04, 45/52
U.S. Cl. 260—28.5 B                                                7 Claims

ABSTRACT OF THE DISCLOSURE

Rubberized coal-tar compositions are provided which are comprised of a water emulsion of coal-tar, a neoprene and fly ash. The relative amounts of the ingredients present in the composition are selected so as to provide a material which, when applied to a surface and allowed to dry, will be non-tacky, non-tracking, flexible, resistant to wear, atmospheric oxidation, radiation degradation and insoluble in organic solvents. The compositions of the invention are especially useful as damp-proofing agents for underground structures, as coatings for driveways and the like, and particularly in water-proofing structures which may be subjected to radiation.

CROSS REFERENCE TO RELATED APPLICATION

This application is a continuation-in-part of copending application, Ser. No. 858,099, filed Sept. 15, 1969, now abandoned.

BACKGROUND OF THE INVENTION (1) Field of the invention

This invention is concerned with a novel class of rubberized coal-tar compositions.

(2) Background of the invention

Asphaltic compositions are widely used in the construction art for various applications. Asphaltic compositions are used for example to damp-proof structures which are normally underground, such as basement walls, to provide water tight roofs on buildings and to coat driveways to make them more durable and resistant to organic solvents such as gasoline. There are, of course, many other uses for these compositions which are well known in the art.

The starting materials used to form these materials are generally obtained as a by-product from the refining of hydrocarbon materials such as petroleum or bituminous coal. The asphaltic residues generally are further refined to recover separate components. For example, by the destructive distillation of bituminous coal a product is obtained which is commonly referred to as coal-tar. Coal-tar includes numerous compounds such as benzenes, xylenes, naphthalene, pyridines and the like. Depending upon the relative purity, coal-tar can vary in color from a black heavy liquid to a light yellow, thin, oily liquid. The material which remains after removal of the coal-tar from the asphaltic residues is a relatively chemically inert material referred to as bitumen or asphalt. It is widely used to make roads and the like.

It has been found that coal-tar can be prepared in the form of aqueous emulsions and used for damp-proofing and the like. Emulsions comprised of only coal-tar are unsatisfactory since they tend to remain tacky and also will track. In addition, the finished coatings have limited resistance to oxidation degradation and somewhat inflexible.

Various suggestions have been made to improve the properties of coal-tar emulsions. Various types of rubbery polymers have been added to these emulsions which improves the flexibility of the resulting coating, thus improving the adhesion of the coating to materials such as concrete and metal.

Other additives have been added to both asphaltic and coal-tar compositions to make the compositions thixotropic, skid resistant, solvent resistant and the like. These additives have included for example sand, talc, china clay, slate flour, mica, silica flour and the like.

Despite the intense research effects in this field over many years the products currently available, whether prepared from a coal-tar base or an asphalt base, have proven to be unsatisfactory in at least one important property. Certain of the materials are tacky and track. Others have poor flexibility and wear resistance. Still others have poor solvent resistance. Certain of the compositions are difficult to prepare due to the reaction condition employed or are difficult to apply because of the requirement that they be heated to high temperatures prior to application and applied in a molten state. Most of the commercially available compositions are unsatisfactory with regard to their oxidation resistance and tend to oxidize and turn gray in a relatively short period of time.

One property which was found to be particularly poor in the commercially available composition is resistance to radioactive radiation. The water storage tanks and concrete ducts used in combination with nuclear reactors are water-proofed with damp-proofing agents to prevent escape of radioactive materials. The water-proofing compositions heretofore suggested have proven to be highly unsatisfactory for this use as they are apparently deteriorated by radioactivity and then washed away. This is becoming a serious problem because of the rapid increase in the use of nuclear power plants.

SUMMARY OF THE INVENTION

It is an object of this invention to overcome the above noted problems and difficulties of the prior art compositions.

It is a still further object of this invention to provide a composition for coating structures which is easily prepared, simple to apply and which, once applied to a structure, will be water resistant, solvent resistant, wear resistant, oxidation resistant, radiation resistant and have anti-slip properties.

Other objects and advantages will become further apparent hereinafter from a continued reading of the specification and subjoined claims.

The objects of this invention have been achieved by providing an aqueous emulsion which contains a solid content of about 70–91% coal-tar, 2–6% neoprene and 7–25% fly ash.

DESCRIPTION OF THE PREFERRED EMBODIMENT

As can readily be appreciated by thse skilled in the art each of the components which comprise the compositions of this invention are well known materials and further that each has heretofore been used in compositions of the type under consideration.

The exact combination of coal-tar, neoprene and fly ash is not believed to have heretofore been employed. However, it should be appreciated that the invention lies not solely in the use of a particular combination of coal-tar, neoprene and fly ash, but in the use of these materials in the percentage stated above.

Coal-tar is the principal component of the composition. It imparts the characteristic of being a water-proof sealing agent. The neoprene when added in an amount of 2–6% based on the weight of the solids upgrades the coal-tar substantially increasing its flexibility. Neoprene must be present in the composition in amounts of at least about 2% to prevent tackyness and eliminate tracking. The use of amounts in excess of 6% neoprene does not adversely affect the properties but does substantially increase the cost.

The addition of 7–25% fly ash to the composition is highly critical as the fly ash is believed, in combination with the coal-tar and neoprene, to impart unusual and superior properties to the final product. The fly ash is not a filler like sand, talc, clay, etc., when used in ap- superior properties to the final product. The fly ash is compositions of this invention is an active ingredient. The inclusion of fly ash represents an important improvement over the use of clay and other materials used in the prior art rubberized coal-tar products. Clay, for example, has an affinity for water. In comparision to clay, the fly ash particles do not absorb water but act rather as a lubricant to impart a smoothness or buttery consistency to the aqueous mixture without substantially increasing its viscosity, thus facilitating its application by brush or otherwise. The fly ash is also responsible for the greatly enhanced thixotropic properties of the new coating material, as compared with the prior art compositions.

A disadvantage of all prior art commercial rubberized coal-tar pavement sealers is that when used for sealing smooth bituminous concrete pavements it was necessary to mix from 4 to 6 pounds of coarse sand into each gallon of coating composition to prevent formation of a sleek, slippery surface and to provide satisfactory traction. This requires hauling sand to the site and additional labor for adding it to the mix. As distinguished from these prior art bituminous pavement sealers the compositions of this invention have the advantage that additions of sand is unnecessary because the fly ash in the composition prevents the final pavement surface from becoming smooth and slippery.

It can be seen therefore that the fly ash has what may be considered opposite characteristics when being applied and after the composition is dryed. When the composition is being applied the fly ash imparts lubricating properties which assist the application of the product. However, once the product is applied and dryed it imparts distinctly different properties to the final coating making it skid-resistant. The fly ash has also been found, when present in the amounts noted above, to substantially increase film strength and toughness of the dried material, which in turn results in greater adhesion.

It has been found that when the compositions of this invention are used in place of the conventional coal-tar emulsion to protect bituminous concrete that superior results are obtained. The coatings last a considerably longer time and do not discolor or age. For example, in a parking lot visitor center, where hundreds of persons per day walk across the coated surface there was almost no noticeable wear after several years despite the fact that many of the vehicles driven on the coated surface had metal studded tires. Even more important, the problem of tackyness and tracking often encountered with the prior art compositions, especially in hot weather, are not a problem with the composition of this invention.

Since the mixture is water soluble, it can be applied to the interior of basement walls in a plurality of layers to interiorly damp-proof the walls. While it is preferable to water-proof the outer surface of a basement wall, that is the side from which the water may come, this is not practical once the basement has been back filled. The excellent adhesion, toughness and hard finish of the composition make it possible to satisfactorily water-proof walls from the interior side even if they are still damp with moisture.

One highly unexpected advantage of the composition of this invention is that the cured coatings are resistant to radioactive degradation. In certain industries, and particularly the electric generating industry, the cooling water is placed in holding tanks and the like. The tanks are cast from concrete. The inside of the tanks are coated with a damp-proofing agent and then often lined with a second layer of concrete. The damp-proofing compositions heretofore used when exposed to radiation degraded to the point that they were useless as sealants. If exposed to direct content with radioactive water they would often deteriorate and wash away.

The compositions of this invention, on the other hand, after an initial slight color change are apparently inert to the radiation. The reasons for this property is unknown except that the total combination which contains the fly ash is radiation resistant while similar compositions without fly ash are readily degraded.

An additional advantageous use for the composition of this invention is to prepare cold built-up roofs. Most flat roofs are applied by using alternating layers of hot pitch and tar paper and then the surface is finished with small stones to prevent slippage on the finished roof. The composition of this invention can be used in place of the hot-pitch and the final stone layer can be omitted because of the inherent slip resistant nature of the dryed composition. Further, because of the excellent weatherability, resistance to oxidation and flexibility, the final roof is highly satisfactory, being comparable to a hot pitch roof and being considerably less expensive to install.

Commercially available water emulsions of coal-tar, in which the water content is approximately 50% by weight, are used in the preparation of the composition of this invention. The neoprene which is employed is commercially available in solution in a light aromatic solvent such as toluol or xylol. The neoprene is stirred into the coaltar emulsion where it is readily assimilated. The fly ash and the additional water required to reduce the viscosity to the desired value are then stirred in to produce the final suspension. It is also practical to stir the fly ash and/or the water into the coal-tar emulsion simultaneously with the neoprene.

It should be carefully noted that the composition of this invention can be prepared by a simple mixing procedure. Complicated reaction conditions are not required as with many similar compositions. The simplicity of the method of manufacture does not, however, detract from the properties of the compositions of this invention. Until ready for use, the mixtures are stable over a wide temperature such as would be encountered in the extremes of both the heat of summer and the cold of winter.

The new compositions, in a mixture with a proper amount of water, have a consistency and viscosity which facilitates roller, squeegee and brush application, and are so markedly thixotropic that they do not drip from the brush. This characteiristic of being thioxotropic is particularly advantageous in brush-applied damp-proofing on vertical surfaces where running or sagging of the material would be objectionable. The thixotropic characteristics of the compositions represents a substantial improvement in comparison with a leading rubberized coal-tar emulsion used in the prior art for sealing vertical surfaces and bituminous pavements. The new compositions also have much better adhesion and greater abrasion resistance.

As noted above it is essential in order to obtain the required combination of property that the percentage of each component must be within the desired amounts. It should be appreciated, however, that for best results the mixture contain on a solid basis about 82.0% by weight of coal-tar, 3.2% by weight of neoprene and about 14.8% by weight of fly ash.

The water content is varied to obtain the desired viscosity in the final mixture. Normally for good results the total water content should be about 40–60% of the total weight of the mixture with optimum results being obtained with about 45–55% by weight of water.

As noted above the viscosity is important. It has been found that the ingredients are added in the amounts required to obtain the optimum properties in the final product if the water is adjusted so that the viscosity is 100–140 Krebs units satisfactory results are obtained.

The amount and thickness of the coating can be varied depending on the type of the finish desired. Thick coatings naturally give more protection. However, on a porous surface it often is best to apply a relatively thin seal coat and then after the seal coat has started to set to apply a second coat. The total amount applied will be less but the results are generally more uniform.

The following examples are given by way of further illustration of the invention and are not intended to limit the scope of the invention beyond that of the subjoined claims. All parts and percentages are parts and percentages by weight not volume unless otherwise noted.

EXAMPLE 1

A sample of the preferred composition prepared in water suspension form as described above, had the following proportions of ingredients in terms of percentages of total weight of the mix:

|  | Percent |
| --- | --- |
| Coal-tar | 44.1 |
| Neoprene | 1.7 |
| Fly ash | 8.2 |
| Water | 46.0 |

This composition was found to have the following physical characteristics:

Tests on water suspension

| | |
| --- | --- |
| Specific gravity | 123. |
| Viscosity (as measured with Stormer Viscosimeter, ASTM D–562). | 114 Krebs units. |
| Ease of application | Excellent. |

Drying time (ASTM D–1010, sec. 11)

| | |
| --- | --- |
| Touch dry | 1 hour. |
| Hard dry | 8 hours. |

Tests after curing

| | |
| --- | --- |
| Accelerated weathering test [1] | Excellent resistance, no cracking or sagging. |
| Adhesion to steel plate | Excellent. |
| Cohesion | Good. |
| Resistance to petroleum products (e.g. gasoline, oil, etc.). | Excellent. |
| Resistance to acid (5% $H_2SO_4$). | Slight disintegration of surface. |
| Resistance to alkali (5% NaOH). | Slight discoloration of surface. |

[1] 5 mil thickness on metal plate was exposed for 720 hours to alternate cycles of ultraviolet light, cold and water.

Comparative tests for hardness and adhesion, after curing, were made with a Hoffman Scratch-Hardness Tester, marketed by Gardner Laboratory, Inc., of Bethesda, Md., on preferred composition and on Super Pavement Sealer, a well-known and extensively used rubberized coal-tar sealer for bituminous pavements marketed by Koppers Company, Inc., of Pittsburgh, Pa. 15219. The tests were made on comparable thicknesses of these materials applied on steel panels.

In the Hoffman Scratch-Hardness Tester, a weighted stylus, comprising a forward leaning metallic right cylinder, is dragged across the coated panel. The following table is a comparison of the results of the above tests which indicate improved hardness and adhesion of the preferred composition as compared with Super Pavement Sealer:

| | Test results | |
| --- | --- | --- |
| Vertical force on stylus, grams | Preferred composition | Koppers Super Pavement Sealer |
| Scratch test: | | |
| 82 | Not scratched | Slightly scratched. |
| 123 | do | Do. |
| 152 | Slightly scratched | Cut through. |
| Adhesion test: | | |
| 90 | Not disbonded | Not disbonded. |
| 110 | do | Disbonded. |
| 1110 | do | |
| 1200 | Disbonded | |

For commercial damp-proofing application, the preferred composition, prepared as in this example, is very satisfactorily and very easily applied with a roller, generally in a single pass, to dry concrete or cement sparged surfaces at the rate of 150 sq. ft. to the gallon, without dripping or running. Workmen, accustomed to applying prior art damp-proofing materials, enthusiastically acclaimed the ease of application and the drip-free covering facility of this composition as compared with the prior art materials.

EXAMPLE 2

A composition of this invention was prepared as a water suspension as described above having the following percentages of weight of total solids:

|  | Percent |
| --- | --- |
| Coal-tar | 87.9 |
| Neoprene | 3.1 |
| Fly ash | 9.0 |

The water component of the suspension of this example was 48.5% of the total weight of the mixture.

This water suspension had a specific gravity of 1.22 and a viscosity of 116 Krebs units, and ease of application was good.

In the cured product, adhesion, cohesion and performance under accelerated weathering test were good.

Comparative hydrostatic tests for resistance to water penetration were made on concrete blocks respectively coated with this composition and with commercial damp proofing products, as follows:

(a) The composition of Example 2.
(b) Petropel, a water emulsion of coal tar containing approximately 50% of water by weight, marketed by Highway Materials, Inc., Drawer E, Bridgeport, Pa. 19405.
(c) Hydronon, a coal-tar-base damp-proofing material marketed by Barrett Division of Celotex Corp., 1500 Dale Mabry Ave., Tampa, Fla. 33607.

The materials were applied by brush to 6" x 6" concrete blocks to a thickness to cover all surface irregularities. Because of the thixotropic property of the composition of this invention this was readily accomplished with a few strokes of the brush, whereas in the case of Petropel and Hydronon, much effort and many strokes of the brush were necessary for a visually determined complete coverage of the surface.

The hydrostatic test comprised maintaining the coated test specimens under a head of 4 feet of water. Penetration of the water through the coating was determined electrically by measurement of leakage current through the concrete, the magnitude of current being considered as an indication of the rate of water penetration.

Under this test, the Hydronon failed almost immediately. The tests on the composition of Example 2 and on the Petropel were terminated at about 720 hours, at which time the current measurements were 0.5 microamp for the composition of Example 2 and 9.5 microamp for the Petropel.

EXAMPLE 3

A composition of this invention was prepared as described above having the following weight percentages of total solids:

| | Percent |
|---|---|
| Coal-tar | 73.6 |
| Neoprene | 3.8 |
| Fly ash | 22.6 |

The water component of the suspension of this example was 45.5% of the total weight of the water suspension.

This water suspension had a specific gravity of 1.28 and a viscosity of 124 Krebs units, and its ease of application was good. Adhesion and cohesion of the cured product were good and its performance under accelerated weathering test was excellent.

EXAMPLE 4

A composition of this invention was prepared as above having the following percentages of total solids by weight:

| | Percent |
|---|---|
| Coal-tar | 86.6 |
| Neoprene | 4.5 |
| Fly ash | 8.9 |

The water component of the suspension of this example was 48.5% of the total weight of the water mix.

This water suspension had a specific gravity of 1.25 and a viscosity of 109 Krebs units and its ease of application was good. Adhesion, cohesion and performance under accelerated weathering test of the cured product were good.

The water suspension compositions of the foregoing examples were characterized by exceptional ease of application.

EXAMPLE 5

A composition of this invention was prepared as above having the following percentages of total solids by weight:

| | Percent |
|---|---|
| Coal-tar | 74.5 |
| Neoprene | 2.6 |
| Fly ash | 22.9 |

The water component of the water suspension of this example was 43.0% of the total weight of the suspension.

This water suspension had a specific gravity of 1.28 and a viscosity of 136 Krebs units. Adhesion and accelerated weathering of the cured product were good.

EXAMPLE 6

A composition was prepared having the following percentages by weight of total solids:

| | Percent |
|---|---|
| Coal-tar | 90 |
| Neoprene | 2 |
| Fly ash | 8 |

In preparing this example, the ingredients were mixed as previously described for the preferred composition, without using any additional water. This water suspension was thixotropic and had a viscosity of 115 Krebs units.

EXAMPLE 7

A composition was prepared having the following weight percentages of total solids:

| | Percent |
|---|---|
| Coal-tar | 70 |
| Neoprene | 6 |
| Fly ash | 24 |

This example was prepared similarly to the preferred composition, with additional water being added to the extent of one part of water to 20 parts by weight of the suspension, so that the resultant water content was 44.0% of the total weight of the final suspension. This water suspension was thioxtropic and had a viscosity of 138 Krebs units.

When additional water was added in the amount of one part of water to 10 parts by weight instead of 20 parts by weight, the resultant water content was 46.5% of the total weight of the final suspension and the viscosity had a value of 117 Krebs units. This water suspension was also found to be thixotropic.

EXAMPLE 8

A bituminous concrete parking lot at a visitor center visted by an average of several hundred persons per day was coated with the composition described in Example 1. The composition was applied at the rate of 1 gallon per 100 square feet. The coating was applied at 75° F. and allowed to dry for 24 hours. The surface was found to be hard, tack-free and had a satin finish. Though the surface was visually quite smooth in appearance, it had definite anti-skid properties even when wet with water.

The visitors reception building floors were evaluated and it was found that there was no tracking of the coating from the lot onto the floor.

The coating was periodically evaluated on approximately a six month basis. The coating was found to be virtually unchanged after 24 months. Previous materials which were evaluated were unsatisfactory after about 1 year.

EXAMPLE 9

A concrete slab was coated with the composition of Example 1. Similar slabs were coated with commercially available coal-tar emulsions. The slabs were aged for 24 hours.

The slabs were first exposed to gamma radiation from a cobalt-60 source, at a rate of $2.0 \times 10^6$ rad/hr., to a total dose of $10^9$ rad.

The slabs were then placed inside a test chamber and subjected to a steam/chemical-spray exposure, as follows. The test was initiated by rapidly admitting steam into the test chamber, increasing the pressure to 100 p.s.i.g. in 18 secs. The temperature within the test chamber increased to 335° F. within approximately 1 min. After these conditions were maintained for 1 hour, the steam pressure was reduced gradually, so that the temperature dropped slowly to 240° F. during approximately 1.5 hrs. and to 150° F. during an additional 3 hours. The conditions in the test chamber were maintained at 0 p.s.i.g./150° F. for approximately 5 days. A chemical spray (1.22% solution of boric acid by weight, buffered with sodium hydroxide to a pH of 9.5) was initiated soon after admission of steam, and maintained throughout the remainder of the test.

Immediately following the test and again two weeks later, the coated slabs were examined in accordance with ASTM procedures for various forms of deterioration. The slabs treated with the commercially available coatings were stripped down to the untreated concrete. No peeling, blistering or cracking was observed in the coating of the composition of this invention. There was, however, evidence of some chalking. The only other observable change in appearance was that the blackness of the coating was less rich at the conclusion of the test.

The coating of this invention is uniquely suited for use in a nuclear fueled reactor plant.

What is claimed is:

1. A composition of matter consisting essentially of from about 70 to 91 weight percent of coal-tar, from about 2 to 6 weight percent of neoprene, and from about 7 to about 25 weight percent of fly ash all in aqueous suspension in which the water content is from about 40% to about 60% of the total weight of the suspension.

2. The composition according to claim 1 in which the coal-tar constitutes about 82.0 weight percent, the neoprene about 3.2 weight percent, and the fly ash about 14.8 weight percent.

3. The composition according to claim 2 in aqueous suspension in which the water content is from about 45% to about 55% of the total weight of the suspension.

4. The composition according to claim 2 in aqueous suspension in which the water content is such that the viscosity of the suspension is within the range of 100 to 140 Krebs units.

5. The method of a damp-proofing structure comprising applying a coating of the composition of claim 1 to said structure.

6. The method of sealing a bituminous concrete surface comprising applying to said surface a coating of the composition of claim 1.

7. The method of protecting a structure against penetration of an aqueous radioactive material comprising coating said structure with the composition of claim 1.

References Cited

UNITED STATES PATENTS

| 3,027,342 | 3/1962 | Kemp et al. | 260—28.5 B |
| 2,537,190 | 1/1951 | Lankau | 260—28.5 B |
| 2,734,882 | 2/1956 | Kirsch | 260—28.5 B |

OTHER REFERENCES

Fillers in Asphaltic Concrete, Carpenter, Public Roads, vol. 27, No. 5, December 1952, pp. 101–110.

ALLAN LIEBERMAN, Primary Examiner

S. L. FOX, Assistant Examiner

U.S. Cl. X.R.

260—28.5 AS, 41.5

UNITED STATES PATENT OFFICE
CERTIFICATE OF CORRECTION

Patent No. 3,763,068           Dated  October 2, 1973

Inventor(s) Paul W. Schuler, Jr.

It is certified that error appears in the above-identified patent and that said Letters Patent are hereby corrected as shown below:

Column 3, line 16, delete --superior properties to the final product. The fly ash is--, and insert therefor --plicant's combinations of ingredients. The fly ash in the--.

Column 5, line 38, change "123" to read --1.23--.

Column 6, Table of Scratch Test Results, For the line containing Vertical force "123", in the "Koppers Super Pavement Sealer" column, change --Do-- to --Severely scratched--.

Signed and sealed this 1st day of January 1974.

(SEAL)
Attest:

EDWARD M. FLETCHER, JR.　　　　RENE D. TEGTMEYER
Attesting Officer　　　　　　　Acting Commissioner of Patents